US009291476B2

(12) United States Patent
Barraci et al.

(10) Patent No.: US 9,291,476 B2
(45) Date of Patent: Mar. 22, 2016

(54) FLIGHT DECK DISPLAY OF PREDEFINED MPA APPROACH PATHS WITH DIFFERENTIATED ASSIGNED APPROACH PATH

(71) Applicant: The Boeing Company, Chicago, IL (US)

(72) Inventors: Nima Barraci, Frankfurt am Main (DE); Matthew B. Hendrian, Aurora, CO (US); Antonio Puentes, San Jose, CA (US)

(73) Assignee: The Boeing Corporation, Chicago, IL (US)

( * ) Notice: Subject to any disclaimer, the term of this patent is extended or adjusted under 35 U.S.C. 154(b) by 411 days.

(21) Appl. No.: 13/644,451

(22) Filed: Oct. 4, 2012

(65) Prior Publication Data

US 2014/0097972 A1 Apr. 10, 2014

(51) Int. Cl.
G08B 21/00 (2006.01)
G01C 23/00 (2006.01)
G08G 5/00 (2006.01)
G08G 5/02 (2006.01)

(52) U.S. Cl.
CPC ............ *G01C 23/005* (2013.01); *G08G 5/0008* (2013.01); *G08G 5/0013* (2013.01); *G08G 5/0021* (2013.01); *G08G 5/0078* (2013.01); *G08G 5/025* (2013.01)

(58) Field of Classification Search
CPC ... G08G 5/025; G08G 5/0021; G08G 5/0013; G08G 5/0039; G08G 5/0043
USPC .......................................... 340/961, 971–980
See application file for complete search history.

(56) References Cited

U.S. PATENT DOCUMENTS

| 8,060,262 B2 * | 11/2011 | Burgin et al. .................... 701/16 |
| 8,195,347 B2 | 6/2012 | Boorman |
| 2005/0234608 A1 * | 10/2005 | Jaillant ............................. 701/4 |
| 2007/0222665 A1 * | 9/2007 | Koeneman ....................... 342/29 |
| 2008/0195309 A1 * | 8/2008 | Prinzel, III et al. ........... 701/208 |
| 2010/0305786 A1 * | 12/2010 | Boorman ........................ 701/16 |
| 2011/0087388 A1 * | 4/2011 | Watson et al. .................. 701/16 |
| 2011/0144832 A1 | 6/2011 | McDowell et al. |

* cited by examiner

*Primary Examiner* — Mark Rushing
(74) *Attorney, Agent, or Firm* — Baldauff IP, LLC; Michael J. Baldauff, Jr.

(57) ABSTRACT

Methods, systems, and computer-readable media are described herein for displaying MPA procedures on a display unit of an aircraft. An assigned MPA approach path to an arrival runway is received at the aircraft. Data regarding a number of predefined MPA approach paths associated with the arrival runway are retrieved, and the assigned MPA approach path is displayed on the display unit in conjunction with other of the predefined approach paths associated with the arrival runway.

18 Claims, 6 Drawing Sheets

FLIGHT DECK DISPLAY OF PREDEFINED MPA APPROACH PATHS WITH DIFFERENTIATED ASSIGNED APPROACH PATH

BACKGROUND

A multi-path arrival ("MPA") procedure may allow air traffic controllers the flexibility to assign incoming aircraft to one of a number of predetermined, charted approach paths, such as multiple "trombone-style" paths to an extended runway centerline from one or more entry points. For aircraft flying a required navigation performance ("RNP") approach, air traffic control ("ATC") may assign an approach path and speed to the aircraft, based on optimal aircraft speed, spacing requirements, other approaching aircraft, arrival time, and the like. ATC may then turn their attention to other aircraft entering the airspace, thus reducing ATC workload, while allowing the aircraft to fly optimal or nearly optimal speeds and descents to an efficient final approach. For aircraft not flying an RNP approach, ATC can still assign the aircraft an optimal or near optimal approach path and vector the aircraft over the assigned approach path during the approach. Such MPA procedures may increase airspace capacity and simplify traffic control around high traffic airports through tighter sequencing of aircraft in the airspace. MPA procedures may further enhance on-time arrival and increase aircraft efficiency.

The effectiveness of an MPA procedure may depend on how well it is adhered to by aircraft. Once an approach path route is chosen for an aircraft and communicated to the flight crew, the flight crew has the burden of maintaining procedural awareness of their own assigned pathway/route as well as situational awareness regarding other aircraft operating in the airspace. While MPA procedures enhance efficiency of aircraft operation and airspace capacity, the number of different characteristics of each approach path/procedure along with aircraft being assigned to different trombones may negatively impact establishment of procedural and situational awareness. ATC has traditionally attempted to ease this task by requesting that the flight crew trail behind another aircraft, thus following a similar route as the preceding aircraft. Some flight crews may have been pre-conditioned to follow preceding aircraft unconsciously. With the high mix of different procedures and approach paths being assigned to aircraft in MPA environments, however, this approach may not be practicable.

It is with respect to these considerations and others that the disclosure made herein is presented.

SUMMARY

It should be appreciated that this Summary is provided to introduce a selection of concepts in a simplified form that are further described below in the Detailed Description. This Summary is not intended to be used to limit the scope of the claimed subject matter.

Methods, systems, and computer-readable media are described herein for displaying MPA procedures on a display unit of an aircraft. According to embodiments presented herein, an assigned approach path to an arrival runway is received at the aircraft. The assigned approach path may be received by ATC datalink, for example. Data regarding a number of predefined MPA approach paths associated with the arrival runway are retrieved, and the assigned approach path is displayed on the display unit in conjunction with other of the predefined approach paths associated with the arrival runway. The assigned approach path may be color-coded or otherwise augmented in order to differentiate the assigned approach path from the other of the predefined MPA approach paths on the display unit, according to some embodiments.

The features, functions, and advantages discussed herein can be achieved independently in various embodiments of the present invention or may be combined in yet other embodiments, further details of which can be seen with reference to the following description and drawings.

DETAILED DESCRIPTION

Figure 1:
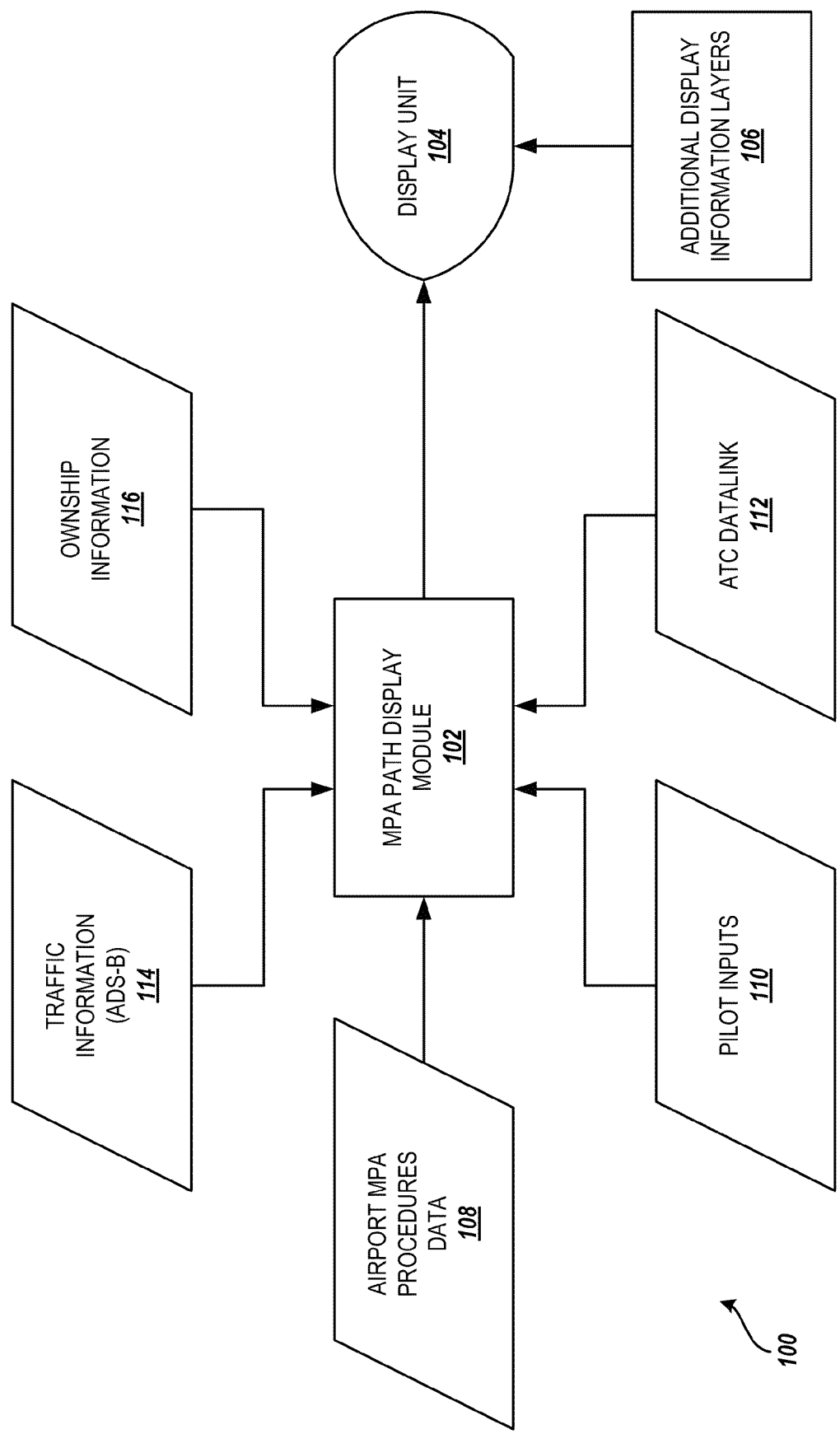
FIG. 1 is a block diagram illustrating various aspects of an MPA path display system of an aircraft, according to embodiments presented herein.

The following detailed description is directed to methods, systems, and computer-readable media for the display of multi-path arrival ("MPA") procedures and related information on a display unit of an aircraft. In an MPA environment, aircraft on approach to a runway at the arrival airport may be sequenced over different, predetermined approach paths, as described in co-pending U.S. patent application Ser. No. 12/651,687 filed Jan. 4, 2010 and entitled "Multiple Transition RNP Approach Procedure," which is incorporated herein by this reference in its entirety. The ability for the flight crews of the aircraft to maintain procedural awareness when utilizing MPA procedures may be enhanced by providing a display on the flight deck that will highlight the assigned approach path and de-emphasize the remaining paths. Situational awareness of other aircraft in the vicinity may also be increased by color-coding the various approach paths and the corresponding aircraft assigned to those paths. The solution described herein may minimize confusion and prevent the wrong arrival procedure from being flown. In addition, as multiple aircraft are assigned different approach pathways, this solution may prevent flight crews from inadvertently following a preceding aircraft that may be assigned a different path.

Throughout this disclosure, embodiments may be described with respect to an aircraft implementing required navigation performance ("RNP") in MPA. However, it should be understood that the concepts presented herein are equally applicable to both RNP and non-RNP aircraft operating in an MPA environment. In addition, while this solution may be described for utilization in an MPA environment, it may also support flight crews executing other approach methods, such as area navigation ("RNAV") approaches, standard terminal arrival route ("STAR") procedures, vectored approaches, and the like. Further, while the embodiments are described in the context of an aircraft on approach, the solution described herein may be applicable to other RNP or RNAV procedures. It will be appreciated that the embodiments described herein are not limited to aircraft on approach to a runway, but may be applicable to any vehicle performing similar navigation procedures, such as spacecraft, boats, and the like on approach to an arrival area.

In the following detailed description, references are made to the accompanying drawings that form a part hereof and that show by way of illustration specific embodiments or examples. In referring to the drawings, like numerals represent like elements throughout the several figures.

FIG. 1 shows various aspects of an illustrative operating environment 100 for the display of MPA procedures on a display unit of an aircraft, according to embodiments. The operating environment 100 includes an MPA path display module 102. The MPA path display module 102 receives information regarding MPA procedures, also referred to herein as approach paths, and related data and displays and/or enhances the display of one or more approach pathways on a display unit 104 of the aircraft. The MPA path display module 102 may be implemented as software, hardware, or a combination of the two within the flight management computer ("FMC"), flight management system ("FMS"), or other avionics systems of the aircraft.

The display unit 104 may be located in the cockpit of the aircraft and may be a graphical display, such as a multi-function display ("MFD") found in a modern "glass cockpit." Alternatively, the display may be an electronic flight bag ("EFB") display, a laptop computer display, a handheld display, or some other suitable display. According to one embodiment, the MPA path display module 102 may display the MPA procedures in conjunction with one or more additional display information layers 106 displayed on the display unit 104 by other subsystems of the FMC/FMS, such as a navigation display ("ND") or other aircraft display layer known in the art.

Figure 2:
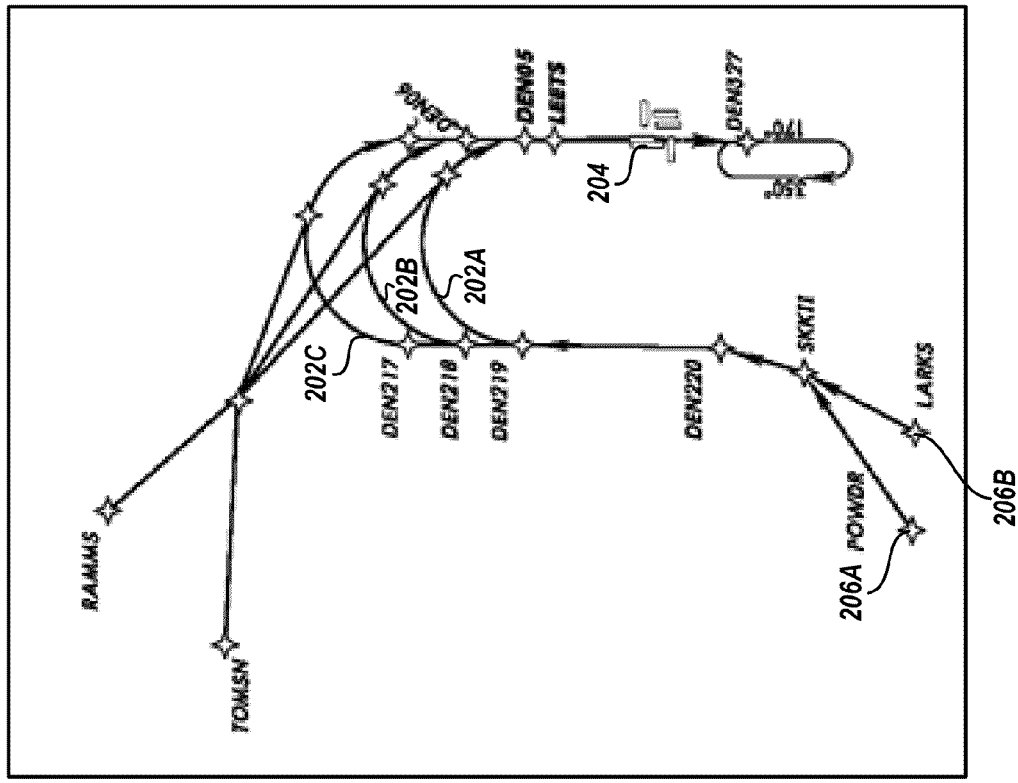
FIG. 2 is reproduction of a portion of a chart showing predefined MPA approach paths for a runway of an airport, according to embodiments presented herein.

The MPA path display module 102 may receive airport MPA procedures data 108 regarding the MPA procedures and other relevant data for display on the display unit 104. The airport MPA procedures data 108 may be stored in or accessible by the FMC/FMS of the aircraft, for example. The airport MPA procedures data 108 may include procedural information for a number of predetermined, charted approach paths for various runways at airports within the operating area of the aircraft. The procedural information may include ground tracks, vertical guidance, and flight speeds that describe precise 3-dimensional linear and/or curved flight paths for approach of the corresponding runway. For example, FIG. 2 is a portion of a chart showing multiple "trombone-style" arrival procedures or approach paths 202A-202C (also referred to herein generally as approach paths 202), defined for approach to a particular arrival runway 204, in this example runway 16R of Denver International Airport (KDEN/DEN).

The approach paths 202A-202C may extend from one or more entry points 206A, 206B, such as POWDR and LARKS shown on the reproduced portion of the chart. Each of the approach paths 202A-202C may further include a 180-degree turn toward the extended centerline of the runway 204 between two waypoints, such as approach path 202A between DEN219 and DEN05, approach path 202B between DEN218 and DEN06, and approach path 202C between DEN217 and DEN07, as further shown in FIG. 2. It will be appreciated that the MPA approach paths 202 may include additional or alternative linear and/or curved flight segments beyond those depicted in FIG. 2 and described herein. The airport MPA procedures data 108 may include digitized ground track and other navigation information regarding the MPA approach paths 202, as well as flight level, speed, and other procedural information for these and other approach paths to the corresponding arrival runway 204.

In order to display the MPA procedures and other relevant information on the display unit 104, the MPA path display module 102 may also receive an assigned MPA approach path 202 for the aircraft, according to embodiments. In some embodiments, the assigned approach path 202 may be received through pilot inputs 110. The pilot inputs 110 may be received from an FMC/FMS, an electronic flight information system ("EFIS") control panel, a multi-function control display unit ("MCDU"), an EFB, a display select panel ("DSP"), and/or other controls or data terminal within the cockpit of the aircraft. For example, the flight crew of the aircraft may receive a verbal assignment to a particular approach path 202 from air traffic control ("ATC"), and then select the assigned approach path from a list of the defined MPA approach paths for the arrival runway 204 on the MCDU in the cockpit. The pilot inputs 110 may further include other information that affect the display of the MPA procedures and other relevant information on the display unit 104, such as an indication of which display in the cockpit to include the display of the MPA procedures, an indication of which additional display information layers 106 to display, a type or mode for the display of the MPA procedures, a range selection for the display, and the like.

In other embodiments, the assigned MPA procedure or approach path 202 may be received electronically via an ATC datalink 112, such as a controller-pilot data link communications ("CPDLC") system of the aircraft. The assigned approach path 202 may be received via the ATC datalink 112 as an alternative to or in addition to the verbal assignment made to the flight crew by ATC. The approach path assignment received via the ATC datalink 112 may be automatically forwarded to the FMC/FMS based upon published procedures. The system may also provide a means for the flight crew to accept or reject the assignment via pilot inputs 110 before changes are made to the loaded arrival procedure in the FMC/FMS. The FMC/FMS may then interpret the approach path assignment and route the information to the MPA path display module 102 and other appropriate related software and hardware within the aircraft.

In further embodiments, software may be incorporated into the FMC/FMS that receives the assigned MPA procedure and automatically updates the flight plan for the aircraft. The new flight plan information may be calculated by aircraft automation and checked against known constraints and issues, such as fuel required or aircraft speed/configuration limitations. From these calculations, the FMC/FMS may either accept the assigned MPA procedure or reject it and/or produce alternative solutions. This information may then be provided to the flight crew in the cockpit, which may acknowledge the assignment or approve an alternative solution through pilot inputs 110. The acknowledgment or alternative solution may then be relayed back to ATC via the ATC datalink 112 and/or voice communications.

The MPA path display module 102 may further receive traffic information 114 regarding other aircraft operating within proximity of the aircraft and/or in the airspace of the arrival runway 204 or airport. The traffic information 114 may include the position, heading, and speed of the other aircraft. The traffic information 114 may be received directly from the other aircraft via an automatic position broadcast system, such as automatic dependent surveillance-broadcast ("ADS-B"). It will be appreciated that traffic information 114 may additionally or alternatively be received from other sources, including, but not limited to, automatic dependent surveillance-rebroadcast ("ADS-R") system, traffic information service-broadcast ("TIS-B") system, or other traffic information source.

According to some embodiments, the traffic information 114 may further include an assigned approach path 202 for the other aircraft from the defined MPA pathways for the arrival runway 204. The assigned approach paths 202 for the other aircraft may be included in the ADS-B broadcasts received from the other aircraft, for example. The assigned approach paths 202 for the other aircraft may also be received through the ATC datalink 112, through pilot inputs 110, and/or through other methods. The traffic information 114 and/or assigned approach paths 202 for the other aircraft may be used by the MPA path display module 102 to enhance the display of the MPA procedures and other relevant information on the display unit 104, as will be described below in regard to FIG. 3A.

The MPA path display module 102 may further receive ownship information 116, such as the current state vector of ownship, thrust levels, phase of flight (e.g. taxi, take-off, approach, or landing), and the like. The MPA path display module 102 may further utilize the ownship information 116 to determine relevant traffic to display along with the MPA procedures on the display unit 104, as will further be described below in regard to FIG. 3A.

According to embodiments, the MPA path display module 102 receives the assigned approach path 202 and draws the pathway on the display unit 104 based on the airport MPA procedures data 108 for the assigned path. The assigned approach path 202 may be displayed on the display unit 104 along with other display information layers 106. For example, the aircraft may be assigned approach path 202B for an arrival runway 204 of 16R at Denver International Airport, as shown in FIG. 2. The MPA path display module 102 may overlay the assigned approach path 202B on the ND, as shown in screen diagrams 300A and 300B illustrated in FIGS. 3A and 3B, respectively. The ND may include an ownship indicator 302 that reflects the current position and heading of ownship in relation to other geographical features positioned on the ND, such as the depicted arrival runway 204. As further shown in FIGS. 3A and 3B, other available MPA approach paths 202A, 202C for the arrival runway 204 may also be drawn by the MPA path display module 102 on the display unit 104.

Figure 3A:
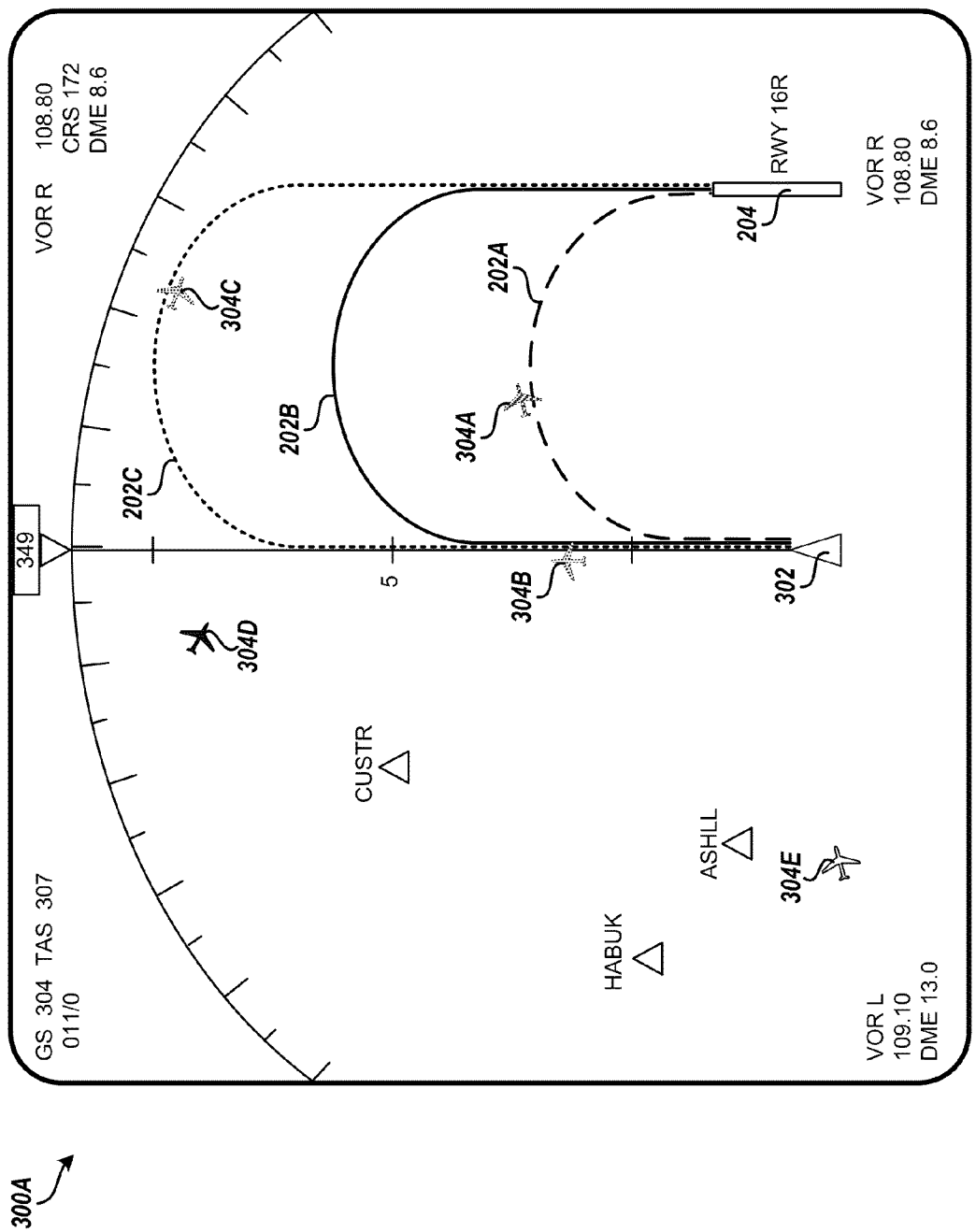
FIGS. 3A and 3B are display diagrams showing illustrative displays of MPA procedures on a display unit of an aircraft, according to embodiments presented herein.
Figure 3B:
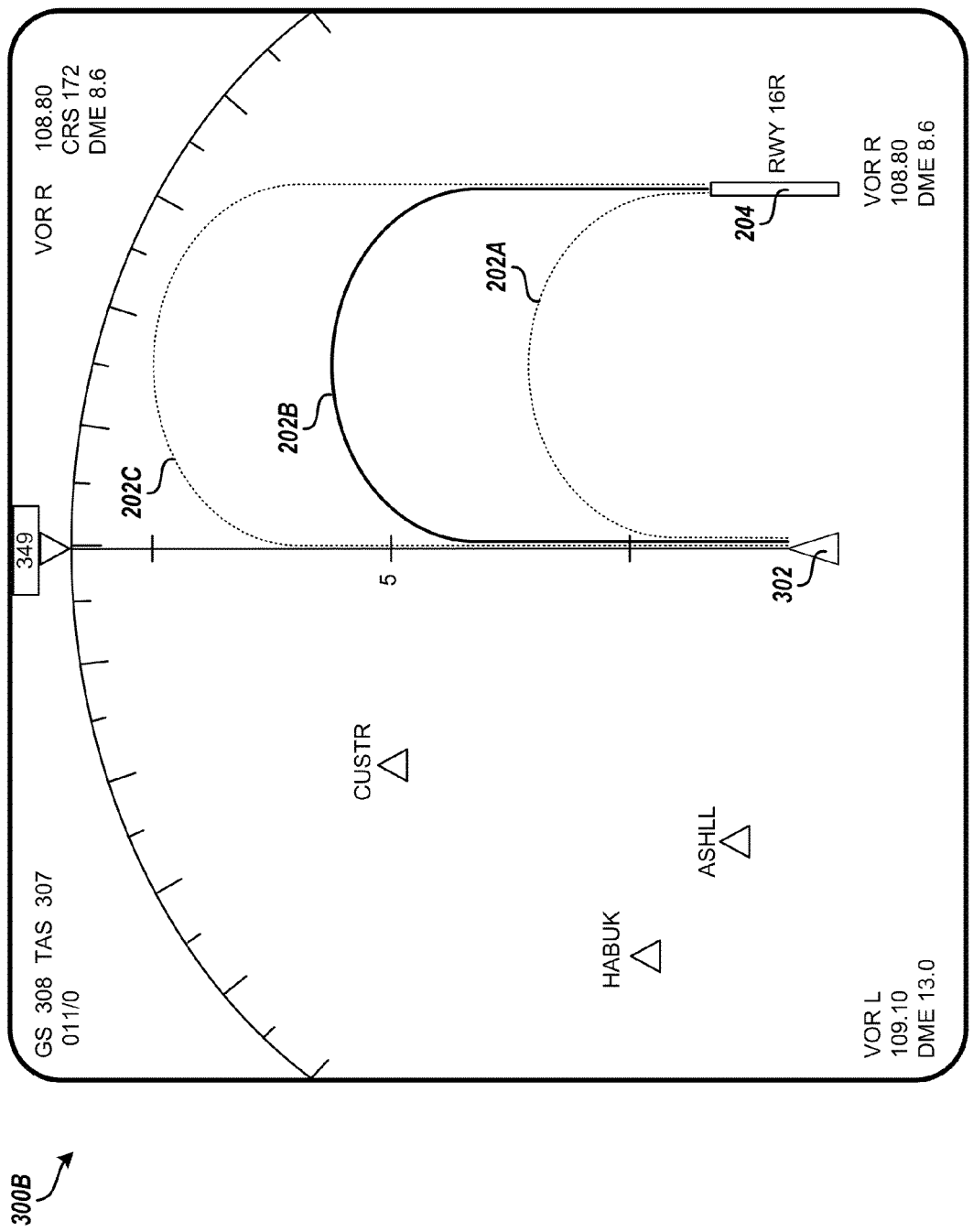

The assigned approach path 202B may be augmented by changing the color and/or character of the graphical display of the approach path to differentiate it from the other approach paths 202A, 202C and to enhance procedural awareness of the flight crew. The color-coding or augmentation of the MPA approach path(s) 202 may be pre-assigned as part of the procedure, or the flight crew may be able to control the color-coding or augmentation of the approach path(s) through pilot inputs 110, for example. In some embodiments, the flight crew may be able to configure the MPA path display module 102 to display the assigned approach path 202B using a specific color or augmentation, to only show the assigned approach path 202B, and/or to de-emphasize the other MPA approach paths 202A, 202C, as shown in FIG. 3B.

Returning to FIG. 3A, the MPA path display module 102 may further display an indicator of the position and heading of other aircraft 304A-304E (referred to herein generally as other aircraft 304) on the display unit 104 operating within proximity of the aircraft and/or within the airspace of the arrival runway 204 or airport, according to some embodiments. The position and heading of the other aircraft 304 displayed on the display unit 104 may be determined from the traffic information 114 received by the MPA path display module 102, for example. In further embodiments, the other aircraft 304 may be augmented or color-coded according to the MPA approach path 202A-202C to which each is assigned, as further determined from the traffic information 114 described above in regard to FIG. 1. For example, as shown in FIG. 3A, if other aircraft 304A is assigned approach path 202A, the indicator for the aircraft on the display unit may be color-coded or augmented to match the color-coding or augmentation of approach path 202A. Similarly, indicators for other aircraft 304B and 304C may be color-coded or augmented to match the color-coding or augmentation of assigned approach path 202C, and the indicator for other aircraft 304D may be color-coded or augmented to match the color-coding or augmentation of assigned approach path 202B.

Other aircraft not yet assigned to an approach path 202 or deemed by the MPA path display module 102 to be less consequential to situational awareness of the flight crew, such as other aircraft 304E in FIG. 3A, may be shown without color-coding or augmentation of the corresponding indicators. The MPA path display module 102 may determine those other aircraft 304 consequential to situational awareness of the flight crew based on the distance of the other aircraft from the host aircraft; the position, speed, and heading of the other aircraft in relation to the host aircraft; the assigned approach paths 202 and overall sequencing of the aircraft to the arrival runway 204; and the like. In some embodiments, the MPA path display module 102 may not display indicators for other aircraft 304 determined to be less consequential to situational awareness of the flight crew on the display unit 104. In further embodiments, the flight crew may provide pilot inputs 110 to configure the display and color-coding or other augmentation of the indicators for other aircraft 304 by the MPA path display module 102 on the display unit 104. For example, the flight crew may choose to not depict the entire traffic assigned pathway picture and only display their own aircraft assigned approach path 202B route to reduce clutter and monitor performance.

It will be appreciated that displaying indicators of the other aircraft 304 along with their assigned MPA approach paths 202 on the display unit 104 may enhance situational awareness of the flight crew on approach. For example, the color-coding of the indicators for other aircraft 304B indicating that the aircraft has been assigned to a different approach path, i.e. approach path 202C instead of assigned approach path 202B highlighted on the display, may prevent the flight crew from inadvertently following the preceding aircraft 304B on the approach, thus maintaining traffic separation minimums and efficient traffic flow to the arrival runway 204. Similarly, the color-coding of the indicators for other aircraft 304D indicating that the aircraft has been assigned to a same approach path 202B may allow the flight crew to discern the intention of this aircraft arriving from a different entry point 206, such as RAMMS shown in FIG. 2, and further understand that they are to be sequenced behind this other aircraft 304D on approach path 202B to the arrival runway 204. In situations where there may be a merging between RNP and non-RNP traffic on approach, the display of the MPA approach paths 202 and the other aircraft 304 may allow the flight crew to determine what the overall sequencing of aircraft is supposed to be.

Figure 4:
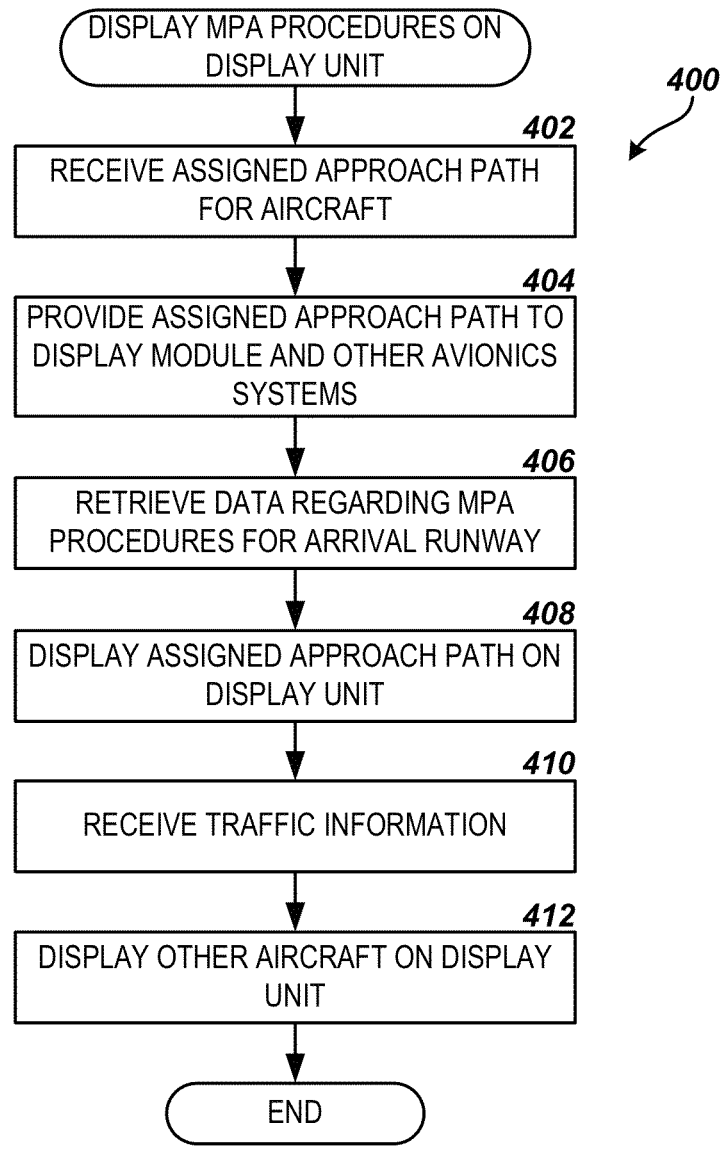
FIG. 4 is a flow diagram illustrating one method for displaying MPA procedures on a display unit of an aircraft, as provided in the embodiments presented herein.

Turning now to FIG. 4, additional details will be provided regarding embodiments presented herein for displaying MPA procedures on a display unit of an aircraft. It should be appreciated that the logical operations described herein are implemented (1) as a sequence of computer implemented acts or program modules running on a computing system and/or (2) as interconnected machine logic circuits or circuit modules within the computing system. The implementation is a matter of choice dependent on the performance and other operating parameters of the computing system. Accordingly, the logical operations described herein are referred to variously as operations, structural devices, acts, or modules. These operations, structural devices, acts, and modules may be implemented in software, in firmware, hardware, in special purpose digital logic, and any combination thereof. It should also be appreciated that more or fewer operations may be performed than shown in the figures and described herein. These operations may also be performed in parallel, or in a different order than those described herein.

FIG. 4 shows a routine 400 for displaying MPA approach path(s) and related information on a display unit 104 of an aircraft. In one embodiment, the routine 400 is performed by the MPA path display module 102 described above in regard to FIG. 1. It will be appreciated that the routine 400 may also be performed by another module or component of the FMC/FMS and/or other avionics systems of the aircraft, or by a combination of modules and components. The routine 400 begins at operation 402, where the MPA path display module 102 receives the assigned MPA procedure or approach path 202 for the aircraft. The assigned approach path 202 may be received through pilot inputs 110 or via the ATC datalink 112, as described above in regard to FIG. 1. For example, the flight crew of the aircraft may receive a verbal assignment to a particular approach path 202 from ATC, and then select the assigned approach path from a list of the defined MPA procedures and approach paths for the arrival runway 204 on the MCDU in the cockpit. Alternatively, the assigned approach path 202 may be received electronically via CPDLC and automatically forwarded to the FMC/FMS based upon published procedures.

The routine 400 proceeds from operation 402 to operation 404, where the assigned approach path 202 is provided to the MPA path display module 102 and/or other modules or components of the FMC/FMS. For example, as further described above in regard to FIG. 1, the FMC/FMS may receive the assigned MPA approach path 202 and automatically update the flight plan for the aircraft. The new flight plan information may be calculated by aircraft automation and checked against known constraints and issues, such as fuel required or aircraft speed/configuration limitations. From these calculations, the FMC/FMS may either accept the assigned MPA procedure or reject it and/or produce alternative solutions. This information may then be provided to the flight crew in the cockpit, which may acknowledge the assignment or approve an alternative solution through pilot inputs 110. The acknowledgment or alternative solution may then be relayed back to ATC via the ATC datalink 112 and/or voice communications, as well as forward to the MPA path display module 102.

From operation 404, the routine 400 proceeds to operation 406, where the MPA path display module 102 receives data regarding the MPA approach paths 202 for the arrival runway 204. The data may be retrieved from airport MPA procedures data 108 associated with the arrival runway 204 and/or airport stored on or accessible to the FMC/FMS of the aircraft. As described above in regard to FIG. 1, the airport MPA procedures data 108 may describe the procedural information for the predetermined, charted approach paths 202 for the associated arrival runway 204, including ground track, vertical guidance, flight speeds, and the like for each of the approach paths.

Next, the routine 400 proceeds from operation 406 to operation 408, where the MPA path display module 102 displays the assigned MPA approach path 202 on the display unit 104 of the aircraft. The MPA path display module 102 may utilize the ground track and/or other data from the airport MPA procedures data 108 associated with the arrival runway 204 to generate the graphical depiction of the approach path 202. According to some embodiments, the MPA path display module 102 may overlay the graphical depiction of the assigned approach path 202B on the ND displayed on the MFD, as shown in screen diagrams 300A and 300B illustrated in FIGS. 3A and 3B, respectively. According to further embodiments, the assigned MPA approach path 202 may be shown on other display units 104 in the cockpit, such as the EFB, a laptop computer display, and/or the like. The MPA path display module 102 may further display other available MPA approach paths 202A, 202C for the arrival runway 204 on the display unit 104, according to embodiments. The displayed approach paths 202 may further be color-coded and/or augmented to differentiate the assigned approach path 202B from the other approach paths 202A, 202C based on published procedure and/or configuration parameters supplied by the flight crew through pilot inputs 110, as further described above in regard to FIGS. 3A and 3B.

The routine 400 proceeds from operation 408 to operation 410, where the MPA path display module 102 receives traffic information 114 regarding other aircraft operating within proximity of the aircraft and/or in the airspace of the arrival runway 204 or airport. For example, the traffic information 114 may include the position and heading of the other aircraft 304 and may be received directly from the other aircraft via ADS-B. According to embodiments, the traffic information 114 may further include an assigned approach path 202 for the other aircraft 304 from the defined MPA pathways for the arrival runway 204 of the aircraft. For example, the assigned approach paths 202 for the other aircraft 304 may be included in the ADS-B broadcasts received from the other aircraft.

From operation 410, the routine 400 proceeds to operation 412, where the MPA path display module 102 displays indicators for the other aircraft 304 on the display unit 104 in conjunction with the MPA approach path(s) 202. As further described above in regard to FIG. 3A, the MPA path display module 102 may display indicators for only those other aircraft 304 determined to be consequential to situational awareness of the flight crew based on the distance of the other aircraft from the host aircraft; the position, speed, and heading of the other aircraft in relation to the host aircraft; the assigned approach paths 202 and overall sequencing of the aircraft to the arrival runway 204; configuration parameters supplied be the flight crew through pilot inputs 110, and the like. In addition, each indicator for the other aircraft 304 may be augmented or color-coded according to the MPA approach path 202A-202C to which the corresponding other aircraft is assigned, as further determined from the traffic information 114. From operation 412, the routine 400 ends.

Figure 5:
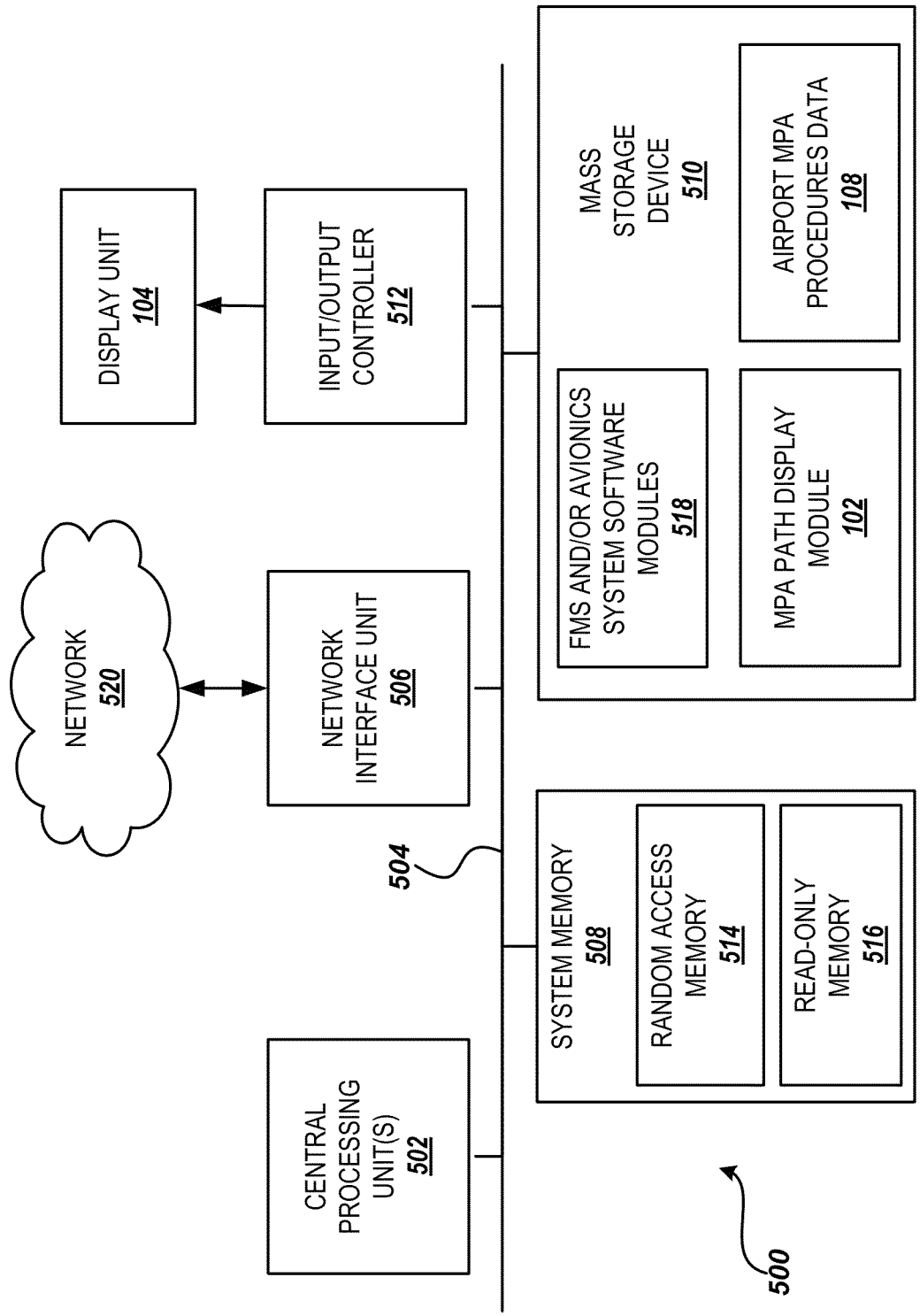
FIG. 5 is a block diagram showing an illustrative computer system capable of implementing aspects of the embodiments presented herein.

FIG. 5 shows an illustrative computer system 500 capable of executing the software components described herein for displaying MPA procedures on a display unit of an aircraft, in the manner presented above. The computer system 500 may be embodied in single computing device or in a combination of one or more processing units, storage units, and/or other computing devices implemented in the FMC/FMS and/or other avionics systems of the aircraft. The computer system 500 includes one or more central processing units 502 ("CPUs"), a system memory 508, including a random access memory 514 ("RAM") and a read-only memory 516 ("ROM"), and a system bus 504 that couples the memory to the CPUs 502.

The CPUs 502 may be standard programmable processors that perform arithmetic and logical operations for the operation of the computer system 500. The CPUs 502 may perform the operations by transitioning from one discrete, physical state to the next through the manipulation of switching elements that differentiate between and change these states. Switching elements may generally include electronic circuits that maintain one of two binary states, such as flip-flops, and electronic circuits that provide an output state based on the logical combination of the states of one or more other switching elements, such as logic gates. These basic switching elements may be combined to create more complex logic circuits, including registers, adders-subtractors, arithmetic logic units, floating-point units, and the like.

The computer system 500 also includes a mass storage device 510. The mass storage device 510 may be connected to the CPUs 502 through a mass storage controller (not shown) further connected to the bus 504. The mass storage device 510 and its associated computer-readable media provide non-volatile storage for the computer system 500. The mass storage device 510 may store various software modules and components of the FMS and/or other avionics systems 518, as well as specific application modules or other program modules, such as the MPA path display module 102 described above in regard to FIG. 1. The mass storage device 510 may also store data collected or utilized by the various systems and modules, such as the airport MPA procedures data 108, also described above.

The computer system 500 may store programs and data on the mass storage device 510 by transforming the physical state of the mass storage device to reflect the information being stored. The specific transformation of physical state may depend on various factors, in different implementations of this disclosure. Examples of such factors may include, but are not limited to, the technology used to implement the mass storage device 510, whether the mass storage device is characterized as primary or secondary storage, and the like. For example, the computer system 500 may store information to the mass storage device 510 by issuing instructions through the storage controller to alter the magnetic characteristics of a particular location within a magnetic disk drive device, the reflective or refractive characteristics of a particular location in an optical storage device, or the electrical characteristics of a particular capacitor, transistor, or other discrete component in a solid-state storage device. Other transformations of physical media are possible without departing from the scope and spirit of the present description, with the foregoing examples provided only to facilitate this description. The computer system 500 may further read information from the mass storage device 510 by detecting the physical states or characteristics of one or more particular locations within the mass storage device.

Although the description of computer-readable media contained herein refers to a mass storage device, such as a hard disk or CD-ROM drive, it should be appreciated by those skilled in the art that computer-readable media can be any available computer storage media that can be accessed by the computer system 500. Computer-readable media includes communication media, such as transitory signals, and computer-readable storage media. Computer-readable storage media includes volatile and non-volatile, removable and non-removable media implemented in any method or technology for the non-transitory storage of information such as computer-readable instructions, data structures, program modules, or other data. For example, computer-readable storage media includes, but is not limited to, RAM, ROM, EPROM, EEPROM, flash memory or other solid state memory technology, CD-ROM, digital versatile disks ("DVD"), HD-DVD, BLU-RAY, or other optical storage, magnetic cassettes, magnetic tape, magnetic disk storage or other magnetic storage devices, or any other medium that can be used to store the desired information in a non-transitory fashion and that can be accessed by the computer system 500. According to one embodiment, the computer system 500 may have access to computer-readable storage media storing computer-executable instructions that, when executed by the computer, perform the routine 400 for displaying MPA procedures on a display unit of an aircraft, as described above in regard to FIG. 4.

According to various embodiments, the computer system 500 may operate in a networked environment using logical connections to other avionics in the aircraft through a network, such as the network 520. The computer system 500 may connect to the network 520 through a network interface unit 506 connected to the bus 504. It should be appreciated that the network interface unit 506 may also be utilized to connect to other types of networks and remote computer systems. The computer system 500 may also include an input-output controller 512 for receiving input and providing output to aircraft terminals and displays, such as the aircraft display unit 104 described above in regard to FIG. 1. The input-output controller 512 may receive input from other devices as well, including an MCDU, an EFIS control panel, a DSP, a keyboard, mouse, electronic stylus, or touch screen associated with the display unit 104. Similarly, the input-output controller 512 may provide output to other displays, a printer, or other type of output device. It will be further appreciated that the computer system 500 may not include all of the components shown in FIG. 5, may include other components that are not explicitly shown in FIG. 5, or may utilize an architecture completely different than that shown in FIG. 5.

Based on the foregoing, it should be appreciated that technologies for displaying MPA procedures on a display unit of an aircraft are provided herein. Although the subject matter presented herein has been described in language specific to computer structural features, methodological acts, and computer-readable media, it is to be understood that the invention defined in the appended claims is not necessarily limited to the specific features, acts, or media described herein. Rather, the specific features, acts, and mediums are disclosed as example forms of implementing the claims.

The subject matter described above is provided by way of illustration only and should not be construed as limiting. Various modifications and changes may be made to the subject matter described herein without following the example embodiments and applications illustrated and described, and without departing from the true spirit and scope of the present invention, which is set forth in the following claims.

What is claimed is:

1. A computer-readable storage medium comprising computer-executable instructions that, when executed by a computer, cause the computer to:
   receive an assigned approach path to an arrival runway for an aircraft, wherein the assigned approach path comprises one of a plurality of predefined fixed multi-path arrival ("MPA") approach paths associated with the arrival runway;
   retrieve data regarding the plurality of predefined fixed MPA approach paths; and
   display the plurality of predefined fixed MPA approach paths on a display unit of the aircraft, visually differentiating the assigned approach path.

2. The computer-readable storage medium of claim 1, wherein the assigned approach path is color-coded to differentiate the assigned approach path from other predefined fixed MPA approach paths on the display unit.

3. The computer-readable storage medium of claim 1, comprising further computer-executable instructions that cause the computer to:
receive traffic information regarding other aircraft within an airspace of the arrival runway; and
display an indication of a position and heading of the other aircraft on the display unit in conjunction with the display of the assigned approach path.

4. The computer-readable storage medium of claim 3, wherein the traffic information comprises an assigned approach path corresponding to each of the other aircraft, and wherein each of the indications of the position and heading of the other aircraft displayed on the display unit is color-coded based on the assigned approach path corresponding to the other aircraft.

5. The computer-readable storage medium of claim 1, wherein the assigned approach path is received electronically via an air traffic control ("ATC") datalink.

6. The computer-readable storage medium of claim 1, wherein the plurality of predefined fixed MPA approach paths comprise trombone-style arrival paths.

7. A system for displaying multi-path arrival ("MPA") procedures in a graphical display of an aircraft, the system comprising:
a display unit in a cockpit of the aircraft;
a memory for storing a program containing computer-executable instructions for displaying MPA approach paths on the display unit; and
a processing unit functionally coupled to the memory and the display unit, the processing unit being responsive to the computer-executable instructions and configured to:
receive an assigned approach path to an arrival runway for the aircraft, wherein the assigned approach path comprises one of a plurality of predefined fixed MPA approach paths associated with the arrival runway,
retrieve data regarding the plurality of predefined MPA approach paths, and
display the plurality of predefined fixed MPA approach paths on the display unit, visually differentiating the assigned approach path.

8. The system of claim 7, wherein the assigned approach path is color-coded to differentiate the assigned approach path from the other of the plurality of predefined fixed MPA approach paths on the display unit.

9. The system of claim 7, wherein the processing unit is further configured to:
receive traffic information regarding other aircraft within an airspace of the arrival runway, the traffic information comprising an assigned approach path corresponding to each of the other aircraft; and
display an indicator for each of the other aircraft on the display unit in conjunction with the display of the assigned approach path, wherein each of the indicators is color-coded based on the assigned approach path corresponding to the other aircraft.

10. The system of claim 7, wherein the assigned approach path is received electronically via an air traffic control ("ATC") datalink.

11. The system of claim 10, wherein a flight plan for the aircraft is automatically updated from the received assigned approach path.

12. The system of claim 7, wherein the plurality of predefined fixed MPA approach paths comprise trombone-style arrival paths.

13. A computer-implemented method for displaying an assigned approach path on a display unit of a vehicle, the method comprising:
receiving, by a computer system of the aircraft, the assigned approach path to an arrival area;
retrieving, by the computer system, data regarding a plurality of predefined fixed approach paths associated with the arrival area; and
displaying, by the computer system, the assigned approach path on the display unit in conjunction with other of the plurality of predefined fixed approach paths associated with the arrival area.

14. The computer-implemented method of claim 13, wherein the assigned approach path is color-coded to differentiate the assigned approach path from the other of the plurality of predefined fixed approach paths on the display unit.

15. The computer-implemented method of claim 13, further comprising:
receiving, by the computer system, traffic information regarding other vehicles operating within proximity of the arrival area; and
displaying an indication of a position and heading of the other vehicles on the display unit in conjunction with the display of the assigned approach path.

16. The computer-implemented method of claim 15, wherein the traffic information comprises an assigned approach path corresponding to each of the other vehicles, and wherein each of the indications of the position and heading of the other vehicles displayed on the display unit is color-coded based on the assigned approach path corresponding to the other vehicle.

17. The computer-implemented method of claim 13, wherein the assigned approach path is received electronically via an air traffic control ("ATC") datalink.

18. The computer-implemented method of claim 13, wherein the plurality of predefined fixed approach paths comprise multi-path arrival ("MPA") procedures.

* * * * *